United States Patent [19]

Carter

[11] 4,176,086

[45] Nov. 27, 1979

[54] CATALYST PREPARATION

[75] Inventor: Cecil O. Carter, Bartlesville, Okla.

[73] Assignee: Phillips Petroleum Company, Bartlesville, Okla.

[21] Appl. No.: 827,519

[22] Filed: Aug. 25, 1977

[51] Int. Cl.$^2$ .......................... B01J 31/22; B01J 31/24
[52] U.S. Cl. ................................. 252/429 B; 585/511; 585/512; 585/513; 585/514
[58] Field of Search ..................................... 252/429 B

[56] References Cited

U.S. PATENT DOCUMENTS

| | | | |
|---|---|---|---|
| 2,828,347 | 3/1958 | Hogan et al. | 260/683.15 |
| 2,945,910 | 7/1960 | Peterson | 260/683.74 |
| 2,969,408 | 1/1961 | Nowlin et al. | 260/683.15 |
| 3,352,634 | 11/1967 | Buchmann | 423/498 |
| 3,355,510 | 11/1967 | Cannell et al. | 260/683.15 |
| 3,485,881 | 12/1969 | Zuech | 252/429 B X |
| 3,631,121 | 12/1971 | Hutson et al. | 260/683.15 |
| 3,681,315 | 8/1972 | Yagi et al. | 252/429 B X |

OTHER PUBLICATIONS

Considine, *Chemical & Process Technology Encyclopedia*, pub. by McGraw-Hill, N.Y., N.Y. (1974) pp. 354–355.
Fieser et al., *Introduction to Organic Chemistry*, pub. by D. C. Heath & Co., Boston (1957) pp. 93 & 94.
Gaylord et al., *Polymer Reviews 2*, pub. by Interscience Pub., Inc., N.Y., N.Y. (1959) pp. 153–154.

*Primary Examiner*—Patrick Garvin

[57] ABSTRACT

Preparation of a hydrocarbon-soluble nickel complex substantially free of moisture comprising reacting a nickel compound with an organic complexing agent in a hydrocarbon solvent to form a complex, allowing the complex to settle and separate into a water phase and a hydrocarbon solution of the complex, then drying the hydrocarbon solution of complex by azeotropic distillation. The substantially anhydrous nickel complex obtained can be mixed with an alkylaluminum halide to form a catalyst system useful for the dimerization of olefins.

9 Claims, 1 Drawing Figure

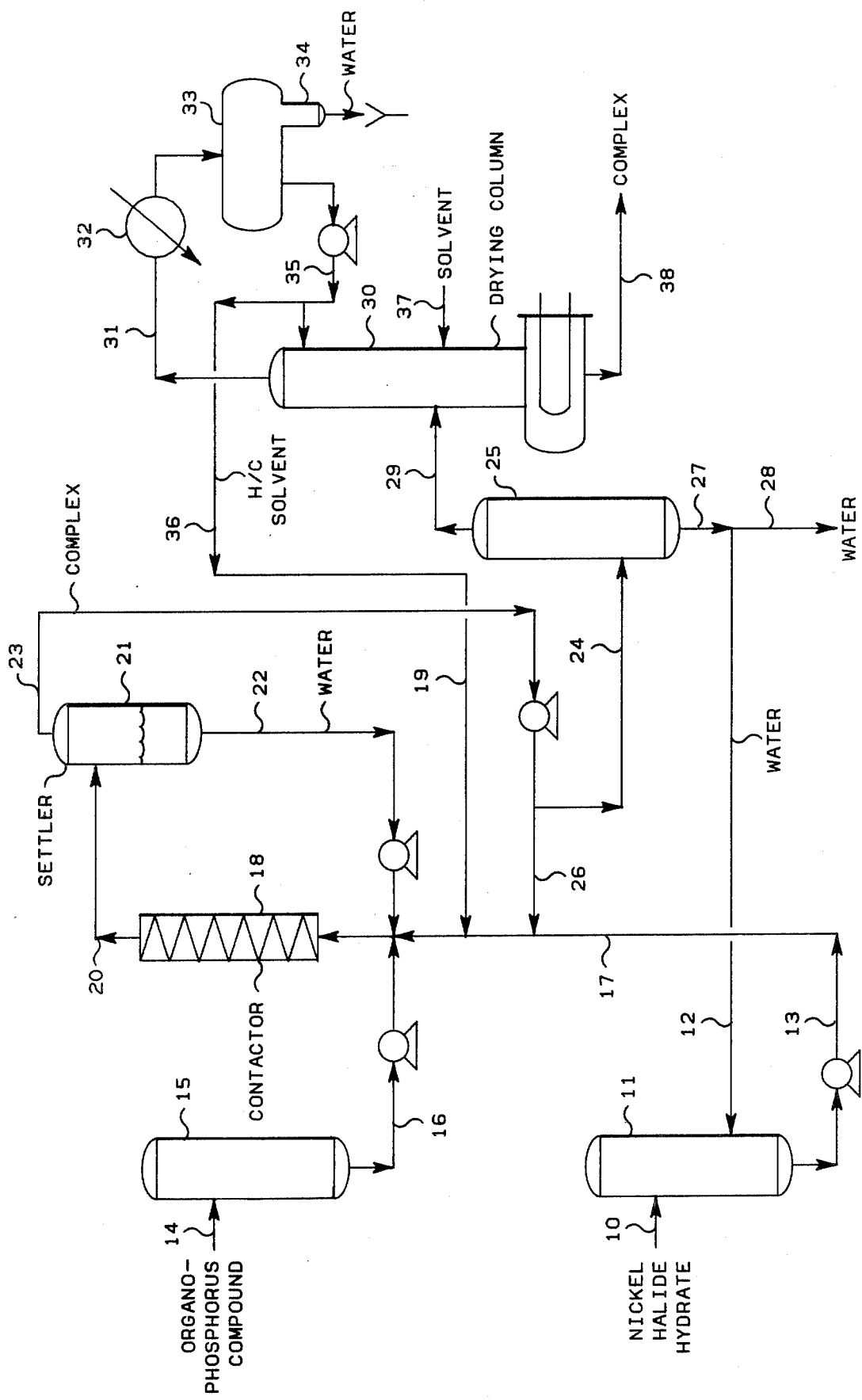

CATALYST PREPARATION

This invention relates to an improved method of preparing a catalyst system. In accordance with another aspect, this invention relates to a process for the preparation of a hydrocarbon-soluble nickel complex substantially free of moisture by reacting the nickel compound with an organic complexing agent in a hydrocarbon solvent and drying the resulting complex by azeotropic distillation. In accordance with another aspect, this invention relates to a process of dehydrating hydrocarbon-soluble nickel complexes prior to combining with an organoaluminum halide to form a catalyst composition by forming the nickel complex in a hydrocarbon solvent and removing water of hydration in the complex by subjecting the complex to azeotropic distillation under temperature and pressure conditions sufficient to remove entrained water overhead and recover substantially anhydrous hydrocarbon solution of complex which can ultimately be mixed with aluminum alkyl halide to form a catalyst system useful in the dimerization of olefins. In accordance with a further aspect, this invention relates to a process for the dimerization of olefins wherein the dimerization is carried out in the presence of the complex of a nickel halide and an organophosphorus-containing compound or other complexing agent with the proviso that the nickel complex is substantially freed of water of hydration prior to mixing with an organoaluminum halide component to form the catalyst system for the dimerization process.

The prior art discloses the use of a number of catalysts for the oligomerization of alpha-olefins. More specifically, some of the prior art catalyst systems contain as part of the catalyst system a hydrocarbon-soluble nickel complex plus an organoaluminum halide. It is well known that water is a rather severe catalyst poison for the nickel/aluminum complex catalysts. The invention is concerned with a convenient, economical method for the commercial preparation of the nickel complex for the catalyst system wherein the hydrocarbon-soluble nickel complex is prepared in substantially anhydrous form prior to mixing with an organoaluminum halide. It has been found that water does not interfere with the preparation of the nickel complex itself, and that the complex can be prepared in a manner such that the resulting complex can be obtained in substantially anhydrous condition prior to combining with the other catalyst components. This discovery greatly simplifies the preparation procedure. Thus, the present invention is directed to an improved process for removing essentially all water from the nickel complex before it is combined with the organoaluminum halide for use in the oligomerization reaction.

Accordingly, an object of this invention is to provide a process for preparing catalyst components essentially free of water.

Another object of this invention is to provide an improved process for producing hydrocarbon-soluble nickel complexes in substantially anhydrous form.

Another object of this invention is to provide a process for dehydrating hydrocarbon-soluble nickel complexes prior to combining with other catalytic components in forming catalyst systems.

Another object of this invention is to provide catalysts for the production of olefin dimers.

Other objects, aspects, and the several advantages of this invention will be apparent to those skilled in the art upon a study of this disclosure and the appended claims.

In accordance with the invention, a process is provided for the preparation of hydrocarbon-soluble nickel complexes substantially free of moisture comprising (1) reacting a hydrate of a nickel compound with an organic complexing agent in a hydrocarbon solvent, (2) allowing the resulting complex to separate into an aqueous phase and a hydrocarbon solution of the complex and (3) drying the hydrocarbon solution of the complex by azeotropic distillation for subsequent use.

In accordance with one specific embodiment, a process for preparing a catalyst comprising a hydrocarbon-soluble nickel compound is provided which comprises (a) forming a hydrocarbon solution of an organophosphorus-containing compound, (b) adding a sufficient amount of a hydrate of a nickel halide or an aqueous solution of a nickel halide to the hydrocarbon solution of the organophosphorus-containing compound under conditions sufficient to cause a reaction and form a complex of the nickel compound and phosphorus compound, (c) allowing the complex thus formed to separate into a water phase and a hydrocarbon solution of the complex, and (d) subjecting same to azeotropic distillation under temperature and pressure conditions sufficient to remove entrained water overhead along with hydrocarbon solvent and recovering as bottoms substantially anhydrous hydrocarbon solution of the complex.

The resulting complex which is substantially free of water obtained as described above can then be mixed with any alkylaluminum halide compound to form a catalyst system useful for dimerization of olefin.

Further in accordance with the invention, the invention further comprises dimerization of olefin utilizing the catalyst formed from (1) an organoaluminum halide component and (2) a complex of a nickel compound with an organo complexing agent such as an organic phosphorus-containing compound which has been prepared as described herein to form a substantially anhydrous complex prior to combining with the organic halide component and using the resulting admixture in the dimerization process.

The catalysts prepared according to the invention can broadly be any hydrocarbon-soluble nickel compound mixed with any alkylaluminum halide. The presently preferred catalyst system comprises a mixture formed from (1) an organoaluminum component and (2) a complex of nickel halide with an organo complexing agent such as described and set forth in U.S. Pat. No. 3,485,881, which is hereby incorporated by reference. Suitable complexing agents disclosed in said patent include organophosphorus compounds, organoarsenic compounds, as well as a number of heterocyclic nitrogen-containing compounds.

Suitable organoaluminum halide components that can be mixed with the complex of a nickel halide as prepared herein preferably include the alkylaluminum halide such as set forth in U.S. Pat. No. 3,485,881.

In preparing the complex of nickel compound with an organic complexing agent such as an organophosphorus-containing compound in accordance with the invention, a hydrate of a nickel compound, preferably a nickel salt, is reacted with an organic complexing agent in a hydrocarbon solvent under conditions to form a complex of the nickel salt, the nickel compound, and the complexing agent. Suitable hydrocarbons that can be employed include any hydrocarbon in which the complexing agent is soluble. Ordinarily, hydrocarbons having up to and including about 10 carbon atoms per molecule are preferred, especially the paraffinic hydrocarbons.

In carrying out the reaction of a nickel compound with the organic complexing agent, an excess of the nickel compound is ordinarily mixed with the organic complexing agent and the mixture is subjected to agitation under conditions of temperature and pressure sufficient to cause a reaction and form a complex. Generally, the reaction conditions will be atmospheric temperature and pressure, albeit elevated temperatures and pressures can be employed when desired.

The nickel compound used for reacting with the organic complexing agent is ordinarily the hydrate of a nickel compound and can be contacted as such with an organic complexing agent in a hydrocarbon solvent or an aqueous solution of the nickel compound can be employed. If desired, a hydrocarbon solution of the organic complexing agent can be formed prior to contacting with the hydrate of the nickel compound or an aqueous solution of the nickel compound. In other instances, the nickel hydrate or aqueous solution of nickel compound can be contacted in a pipeline or suitable contacting device in which the organic complexing agent and hydrocarbon solvent are present.

Following formation of the complex of the nickel halide with an organic complexing agent, the complex is allowed to settle and separate into a water phase which can contain excess unreacted nickel compound and a hydrocarbon solution of the complex. The water phase can be removed from the settling or separation zone and recycled for reuse in forming additional compound solution. Similarly, the excess unreacted nickel compound can be recycled for reuse.

The hydrocarbon solution of the complex, after removal of essentially all of the water by settling, is passed with or without further separation of water to an azeotropic distillation zone wherein the complex is subjected to azeotropic distillation conditions of temperature and pressure sufficient to take overhead the substantially remaining water in the complex along with hydrocarbon solvent. The hydrocarbon solvent can be recovered from the overhead and recycled for contacting with the organic complexing agent and nickel compound. If desired, a suitable hydrocarbon solvent, preferably one that is heavier than the hydrocarbon solvent used in the initial reaction, is added to the azeotropic distillation zone to dilute the complex which is obtained prior to further use. The complex removed from the azeotropic distillation zone is substantially free of moisture and can be combined with an organoaluminum halide component and used as a suitable catalyst system for olefin dimerization.

The olefins to which the present dimerization process is directed include cyclic monoolefins of up to about twelve carbon atoms per molecule and acyclic monoolefins having from about two to twelve carbon atoms, inclusive, where the acyclic monoolefin can be a terminal or an internal olefin, branched or unbranched, but has no branching nearer than the three-position to the double bond. Examples of suitable monoolefins which can be used according to the present invention are ethylene, propylene, butene-1, butene-2, pentene-1, pentene-2, cyclopentene, cyclohexene, 3,4,5-trimethylcyclohexene, 3-methylbutene-1, cycloheptene, hexene-2, heptene-1, cyclooctene, 4,4-dimethylheptene-2, decene-1, dodecene-1, and the like, and mixtures thereof.

The reaction conditions and other reaction parameters utilized for the dimerization of olefins or mixtures of olefins are well known in the art and can be carried out as set forth in U.S. Pat. No. 3,485,881. Similarly, the contacting technique can be batch or continuous, and the recovery of product likewise can be as set forth in the prior art.

A better understanding of the invention will be obtained upon reference to the accompanying drawing, which diagrammatically illustrates one embodiment of the invention.

Referring now to the drawing, nickel halide hydrate is introduced by line 10 to vessel 11 wherein the nickel halide is mixed with water introduced by line 12 and a solution of the nickel halide is removed from the bottom of the vessel by way of line 13.

A suitable complexing agent such as an organophosphorus compound, e.g., tri-n-butylphosphine, is introduced by line 14 into vessel 15 wherein the phosphorus compound can be dissolved in a suitable hydrocarbon solvent and the solution removed by way of line 16. The nickel halide aqueous solution removed from vessel 11 can be passed by way of line 17 and mixed with phosphorus compound introduced by line 16 and introduced into contactor 18 wherein the nickel halide reacts with the phosphorus-containing compound to form a complex. Prior to introduction into contactor 18, recycled hydrocarbon is introduced into line 17 by way of line 19. The complex formed in contactor 18 is removed by line 20 and passed to settler 21.

Within settler 21 the complex is allowed to phase separate into a lower water phase which is removed by line 22 and recycled for contact with the nickel halide and organic phosphorus-containing compound prior to introduction into contactor 18. An upper hydrocarbon solution of the complex is removed from settler 21 by line 23 and then passed to the water knockout tank 25 by way of line 24. A portion of the complex can be recycled to contactor 18 by way of line 26. Water is removed from the base of tank 25 by way of line 27 and recycled by way of line 12 to vessel 11. If desired, a portion of the water can be removed from the system by way of line 28.

The hydrocarbon solution of the complex substantially freed of free water is passed by way of line 29 to azeotropic distillation column 30 wherein the complex is subjected to conditions of temperature and pressure sufficient to take overhead the remaining water and hydrocarbon solvent, e.g., normal pentane, by way of line 31 wherein it is cooled and condensed by cooler 32 and passed to accumulator 33. Water can be removed from accumulator 33 by line 34 for further use as desired. Hydrocarbon solvent is removed from accumulator 33 by way of line 35 and in part returned as reflux to azeotropic distillation column 30, and the remainder passed by way of lines 36 and 19 for recontacting in contactor 18.

A hydrocarbon solvent heavier than the hydrocarbon solvent in line 36 is introduced by line 37 into column 30 to dilute the complex which is removed substantially freed of all moisture by way of line 38. The complex in line 38 can be passed to storage or for mixing with an organoaluminum halide component for formation of a catalyst which then can be passed to a suitable dimerization zone for conversion of olefins to dimers.

EXAMPLE

In a continuous plant, nickel (II) chloride hexahydrate at a rate of 261.6 kg/hr is mixed with tri-n-butylphosphine at a rate of 404.6 kg/hr in a reactor operated at about 27° C. to yield 534.3 kg/hr of the complex bis(tri-n-butylphosphine) dichloronickel. To dilute the complex and reduce water solubility in the organic phase, 1243.6 kg/hr of n-pentane is recycled from the drying column to the reactor. Average residence time in the reactor is ten minutes. Complex dissolved in n-pentane is phase separated from the aqueous phase and pumped to a drying column where the residual water, 0.3 kg/hr, is azeotroped overhead with the pentane, condensed, and phase separated to permit decantation of the water. Part of the pentane is returned to the column as reflux and the remainder is recycled to the reactor. A heavier solvent, n-heptane, is added to the column to dilute the complex which is yielded as bottoms product.

The invention is applicable to the preparation of any hydrocarbon-soluble nickel complex, and particularly the various groups disclosed in U.S. Pat. No. 3,485,881. The invention can be carried out in either a batch or continuous process, as is known in the prior art.

The material balance for the above example and as related to the drawing described above is as follows:

| | (10) Nickel Chloride Hydrate | (14) Tri-n-butylphosphine | (38) Catalyst Complex | (28) Net Water from Kockout | (36) n-Pentane Solvent | (34) Water from Drying Column |
|---|---|---|---|---|---|---|
| MATERIAL BALANCE (kg/hr) | | | | | | |
| NiCl$_2$ | 142.7 | | | 13.0 | | |
| H$_2$O | 118.9 | | | 118.6 | | 0.3 |
| Tri-n-butylphosphine | | 404.6 | | | | |
| Complex | | | 534.3 | | | |
| n-Pentane | | | | | 1,243.6 | |
| Total | 261.6 | 404.6 | 534.3 | 131.6 | 1,243.6 | 0.3 |

I claim:

1. A process for preparing a catalyst system comprising a hydrocarbon-soluble nickel compound which comprises the steps of:
   (a) reacting a hydrate of a nickel compound with an organic complexing agent in a hydrocarbon solvent under conditions to form a complex of said nickel compound and said complexing agent which also contains water of hydration,
   (b) allowing the complex formed in (a) to settle and separate into a water phase and a hydrocarbon solution of the complex, and
   (c) drying said hydrocarbon solution of complex separated in (b) by subjecting same to azeotropic distillation under temperature and pressure conditions sufficient to remove entrained water overhead along with hydrocarbon solvent and as bottoms substantially anhydrous hydrocarbon solution of complex.

2. A process according to claim 1 wherein the complex obtained in step (c) is mixed with an organoaluminum halide to form a catalyst useful for the dimerization of olefins.

3. A process according to claim 1 wherein the nickel compound is a nickel halide and the excess amount of nickel halide is reacted with an organic complexing agent in step (a) and the hydrocarbon solvent in step (a) is a paraffinic hydrocarbon having up to and including about 10 carbon atoms per molecule.

4. A process according to claim 1 wherein a hydrocarbon heavier than said hydrocarbon solvent is added to said azeotropic distillation to dilute the nickel complex which is yielded as bottoms.

5. A process according to claim 4 wherein the hydrocarbon solvent is normal pentane and the heavier hydrocarbon is n-heptane and further wherein the temperature and pressure during complex formation in step (a) is about atmospheric and further wherein the separated water and hydrocarbon solvent in step (c) are recycled to step (a).

6. A process for preparing a catalyst component that is substantially free of moisture comprising a hydrocarbon-soluble nickel complex which comprises the steps of:
   (a) forming an aqueous solution of a nickel halide,
   (b) contacting the aqueous nickel halide solution of (a) with a hydrocarbon solution of an organophosphine under conditions such that the reaction takes place and a complex of the nickel halide with the organophosphine compound is formed,
   (c) allowing the complex to phase separate into an aqueous phase and a hydrocarbon solution of the complex,
   (d) passing the hydrocarbon solution of the complex to an azeotropic distillation zone and therein subjecting same to azeotropic distillation conditions of temperature and pressure sufficient to remove entrained water overhead along with hydrocarbon solvent and as bottoms substantially anhydrous hydrocarbon solution of complex,
   (e) recycling hydrocarbon solvent recovered overhead to step (b), and
   (f) recycling water separated from settling zone to step (b).

7. A process according to claim 6 wherein the nickel halide is nickel chloride, the organophosphine is tri-n-butylphosphine, and the hydrocarbon solvent is n-pentane.

8. A process according to claim 6 wherein a hydrocarbon heavier than said hydrocarbon solvent is introduced into said azeotropic distillation zone in an amount sufficient to dilute the complex yielded as bottoms.

9. A process according to claim 8 wherein the nickel halide is nickel chloride, the organophosphine is tri-n-butylphosphine, the hydrocarbon solvent is n-pentane, and the hydrocarbon added to said azeotropic distillation zone is n-heptane.

* * * * *